United States Patent
Xu et al.

(10) Patent No.: US 12,395,867 B2
(45) Date of Patent: Aug. 19, 2025

(54) PROTECTION METHOD FOR RADIO FREQUENCY OPERATION ABNORMALITY, RADIO FREQUENCY HOST, AND RADIO FREQUENCY OPERATION SYSTEM

(71) Applicant: HANGZHOU BRONCUS MEDICAL CO., LTD., Zhejiang (CN)

(72) Inventors: Hong Xu, Zhejiang (CN); Changjie Cui, Zhejiang (CN)

(73) Assignee: Hangzhou Broncus Medical Co., Ltd., Hangzhou (CN)

( * ) Notice: Subject to any disclaimer, the term of this patent is extended or adjusted under 35 U.S.C. 154(b) by 512 days.

(21) Appl. No.: 17/950,268

(22) Filed: Sep. 22, 2022

(65) Prior Publication Data

US 2023/0016753 A1 Jan. 19, 2023

Related U.S. Application Data

(63) Continuation of application No. PCT/CN2021/072952, filed on Jan. 20, 2021.

(30) Foreign Application Priority Data

Dec. 31, 2020 (CN) .......................... 202011638331.X

(51) Int. Cl.
H04W 24/04 (2009.01)
(52) U.S. Cl.
CPC .................. H04W 24/04 (2013.01)
(58) Field of Classification Search
CPC .......... A61B 2018/00791; A61B 2018/00577; A61B 2018/00702; H04W 24/04; H04W 52/52

See application file for complete search history.

(56) References Cited

U.S. PATENT DOCUMENTS

2022/0241001 A1* 8/2022 Wang ................ A61B 18/1477

FOREIGN PATENT DOCUMENTS

| CN | 203970535 U | | 12/2014 | |
|---|---|---|---|---|
| CN | 203971193 U | | 12/2014 | |
| CN | 105792469 A | | 7/2016 | |
| CN | 110897710 A | * | 3/2020 | ............. G16H 40/63 |

(Continued)

OTHER PUBLICATIONS

International Search Report in corresponding International Application No. PCT/CN2021/072952, mailed Sep. 22, 2021.

Primary Examiner — Dung Hong

(57) ABSTRACT

Disclosed are a protection method for radio frequency operation abnormality, a radio frequency host, and a radio frequency operation system. The protection method for radio frequency operation abnormality includes: detecting preset kinds of detection data of a radio frequency operation in real time when detecting that a radio frequency host continuously outputs radio frequency energy; determining whether detected preset kinds of detection data meets a preset abnormal state; and when the preset abnormal state is met, controlling a radio frequency generating apparatus to stop outputting radio frequency energy and controlling an emergency stop apparatus to cut off a radio frequency energy output path of the radio frequency host. By means of dual protection for operation abnormality, safety of radio frequency operation is improved.

9 Claims, 4 Drawing Sheets

(56) References Cited

FOREIGN PATENT DOCUMENTS

| | | | | | |
|---|---|---|---|---|---|
| CN | 111214288 | A | * | 6/2020 | ............. A61B 18/12 |
| CN | 211243679 | U | * | 8/2020 | |
| CN | 211301764 | U | * | 8/2020 | |
| JP | 2680877 | B2 | * | 11/1997 | |
| JP | 2014236788 | A | * | 12/2014 | |

* cited by examiner

PROTECTION METHOD FOR RADIO FREQUENCY OPERATION ABNORMALITY, RADIO FREQUENCY HOST, AND RADIO FREQUENCY OPERATION SYSTEM

CROSS REFERENCE OF RELATED APPLICATIONS

This application is a continuation of International Patent Application No. PCT/CN2021/072952, filed on Jan. 20, 2021, which claims priority of Chinese Patent Application No. 202011638331.X, filed on Dec. 31, 2020, the entire contents of which are hereby incorporated by reference in their entities.

TECHNICAL FIELD

Embodiments of this application relates to the field of electronic technologies, and in particular to a protection method for radio frequency operation abnormality, a radio frequency host, and a radio frequency operation system.

BACKGROUND

During a radio frequency operation, any accidents and failures may occur and lead to abnormal radio frequency operation, thereby causing damage to a radio frequency host and a radio frequency operated object, and further may cause harm to a user performing the radio frequency operation. Therefore, how to effectively protect against abnormal radio frequency operation is important technical research content.

In the prior art, when an abnormal radio frequency operation is found, an alarm prompt is usually given. If the operator does not notice the prompt for some reason, it will cause operation risks to an operation target or cause damage to a high-frequency host equipment. This prompt method cannot form effective protection against abnormal radio frequency operation.

SUMMARY

Technical Problem

Embodiments of this application provide a protection method for radio frequency operation abnormality, a radio frequency host, and a radio frequency operation system, which can achieve dual protection by stopping outputting radio frequency energy and cutting off a radio frequency energy path when a radio frequency operation is abnormal, thereby improving safety of radio frequency operations.

Technical Solution

In one aspect, an embodiment of this application provides a protection method for radio frequency operation abnormality, including:

detecting preset kinds of detection data of a radio frequency operation in real time when detecting that a radio frequency host continuously outputs radio frequency energy;

determining whether detected preset kinds of detection data meets a preset abnormal state; and controlling a radio frequency generating apparatus to stop outputting radio frequency energy and controlling an emergency stop apparatus to cut off a radio frequency energy output path of the radio frequency host when the preset abnormal state is met.

In one aspect, an embodiment of this application provides a radio frequency host including a detecting apparatus, a radio frequency generating apparatus, and an emergency stop apparatus;

wherein the detecting apparatus is configured to detect preset kinds of detection data of a radio frequency operation in real time when it is detected that the radio frequency host continuously outputs radio frequency energy;

the detecting apparatus is further configured to: determine whether detected preset kinds of detection data meets a preset abnormal state; and the detecting apparatus is further configured to control the radio frequency generating apparatus to stop outputting radio frequency energy and control the emergency stop apparatus to cut off a radio frequency energy output path when the preset abnormal state is met.

In one aspect, an embodiment of this application provides a radio frequency host, including:

a memory and a processor; wherein the memory stores executable program codes; the processor coupled with the memory calls the executable program codes stored in the memory to execute the aforesaid protection method for radio frequency operation abnormality.

In one aspect, an embodiment of this application provides a radio frequency operation system, comprising: a radio frequency host and an injection pump; wherein the radio frequency host is configured to execute the aforesaid protection method for radio frequency operation abnormality; and the injection pump is configured to inject liquid with a preset function to a radio frequency operated object under control of the radio frequency host.

Advantageous Effect

From the above embodiments of this application, it can be known that: when a radio frequency host continuously outputs radio frequency energy, preset kinds of detection data of a radio frequency operation is detected in real time; it is determined whether detected data meets a preset abnormal state; and if yes, a radio frequency generating apparatus is controlled to stop outputting radio frequency energy and an emergency stop apparatus is controlled to cut off a radio frequency energy output path of the radio frequency host. The above two means of protection are performed at the same time to prevent protection failure caused by failure or malfunctioning of either means, a success rate of protection is improved, and safety of radio frequency operations is improved.

BRIEF DESCRIPTION OF THE DRAWINGS

In order to describe the technical solutions according to the embodiments of the present invention or in the prior art more clearly, the drawings needed to be used in the embodiments or in the prior art will be described briefly below. Apparently, the drawings in the following description show some embodiments of the present application. Other drawings can be obtained by persons of ordinary skill in the art based on these drawings without creative efforts.

DESCRIPTION OF THE EMBODIMENTS

In order to make the objects, technical solutions and advantages of the embodiments of the present invention clearer, the technical solutions according to the embodiments of the present invention will be clearly and completely described with reference to drawings in the embodiments of the present invention. Apparently, the embodiments described are merely some embodiments, but not all of the embodiments of the present application. All other embodiments obtained by ordinary persons skilled in the art based on the embodiments of the present invention without creative efforts shall fall within the protection scope of the present invention.

Figure 1:
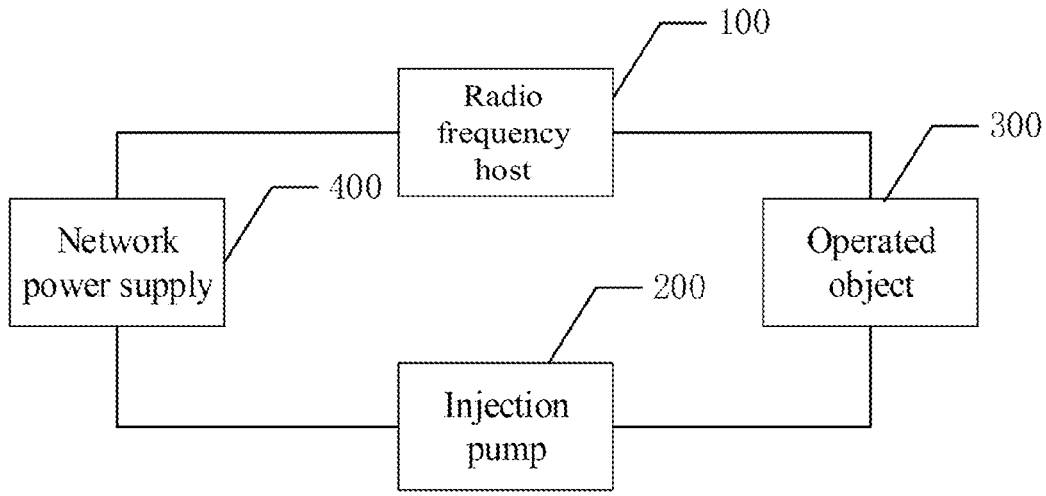
FIG. 1 is a schematic diagram of an application scene of a protection method for radio frequency operation abnormality according to an embodiment provided by this application.

Referring to FIG. 1, which is a schematic diagram of an application scene of a protection method for radio frequency operation abnormality provided by an embodiment of this application. The protection method for radio frequency operation abnormality can be configured to: when a radio frequency host continuously outputs energy, protect the radio frequency host and a radio frequency operated object from being damaged through multiple manners if it is detected that a radio frequency operation appears an abnormal state, thereby improve safety of radio frequency operation.

Specifically, as shown in FIG. 1, a radio frequency host 100, an injection pump 200, and an operated object 300 are interconnected to form a radio frequency operating system, which is powered by a network power supply 400. The network power supply 400 is a typical AC220V voltage, and a power supply system of the radio frequency host 100 itself performs necessary processing and splitting for the network power supply 400 and then outputs power to other apparatuses or modules of the radio frequency host 100. The radio frequency host 100 may specifically be a radio frequency ablation apparatus or the like, which outputs radio frequency energy to the operating object 300. During radio frequency operations, according to requirements of the operations, the injection pump 200 injects liquid into the operating object 300 for cooling, reducing impedance, etc.

Figure 2:
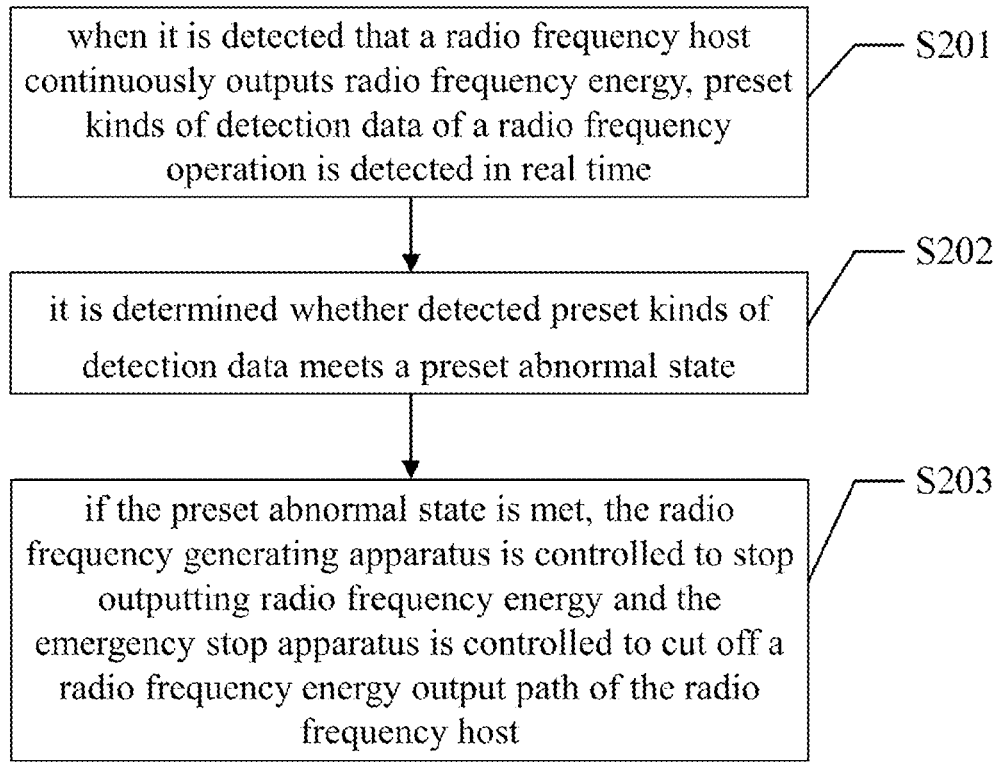
FIG. 2 is a schematic flow chart of a protection method for radio frequency operation abnormality according to an embodiment provided by this application.

Referring to FIG. 2, which is a schematic flow chart of a protection method for radio frequency operation abnormality provided by an embodiment of this application. The method can be applied in the radio frequency host as shown in FIG. 1. As shown in FIG. 2, the method specifically comprises the follows steps.

Step S201, when it is detected that a radio frequency host continuously outputs radio frequency energy, preset kinds of detection data of a radio frequency operation is detected in real time.

An executing main body of this embodiment is a radio frequency host, the radio frequency host includes at least a detecting apparatus, a controlling apparatus, a radio frequency generating apparatus, and an emergency stop apparatus, the controlling apparatus is connected to the detecting apparatus, the radio frequency generating apparatus, and the emergency stop apparatus respectively, and the detecting apparatus is further connected to the radio frequency generating apparatus.

The detecting apparatus is configured to detect various data of a radio frequency operation process, including data of radio frequency energy output, an impedance and a temperature of an operated object, voltages and currents of circuits, etc. In addition, the detecting apparatus is further provided therein with a processor that is independent of the controlling apparatus of the radio frequency host, including a single-chip microcomputer, a MCU (Microcontroller Unit), a CPU (Central Processing Unit), etc., which can achieve functions of data collection, data distribution, data analysis, and so on.

The radio frequency apparatus is configured to emit radio frequency energy acting on an operated object.

The emergency stop apparatus is configured to stop a radio frequency operation quickly when an emergency state predetermined in a system occurs.

The controlling apparatus is a processor of the radio frequency host, which is configured to acquire data, analyzed data, and control starting and stopping of functions of all apparatuses or modules in the radio frequency host according to analysis result.

Specifically, the radio frequency energy data includes output power and output time of radio frequency energy, the detecting apparatus detects data of radio frequency energy emitted by the radio frequency generating apparatus; when the output power of radio frequency energy reaches preset working power and the output time reaches a preset output time, it is determined that the radio frequency main frame continuously outputs radio frequency energy to the operated object, and enters a stable radio frequency operation stage.

Step S202, it is determined whether detected preset kinds of detection data meets a preset abnormal state.

The preset abnormal state includes an abnormality determination standard for the preset kinds of detection data.

Furthermore, information of the abnormal state is also set in the controlling apparatus.

Step S203, if the preset abnormal state is met, the radio frequency generating apparatus is controlled to stop outputting radio frequency energy and the emergency stop apparatus is controlled to cut off a radio frequency energy output path of the radio frequency host.

When the detection data of the detecting apparatus meets the preset abnormal state, dual protection including the following two means is performed for a radio frequency operation appearing abnormality.

One is controlling the radio frequency generating apparatus to stop outputting radio frequency energy, and the other is to control the emergency stop apparatus to cut off the radio frequency energy output path of the radio frequency host. It can be prevented that unexpected failure of any one means causes radio frequency energy to output continuously and brings damage to the operated object and the radio frequency host.

In this embodiment of this application, when a radio frequency host continuously outputs radio frequency energy, preset kinds of detection data of a radio frequency operation is detected in real time; it is determined whether detected data meets a preset abnormal state; and if yes, a radio frequency generating apparatus is controlled to stop outputting radio frequency energy and an emergency stop apparatus is controlled to cut off a radio frequency energy output path of the radio frequency host. The above two means of protection are performed at the same time to prevent protection failure caused by failure or malfunctioning of either means, a success rate of protection and safety of radio frequency operations are improved.

Figure 3:
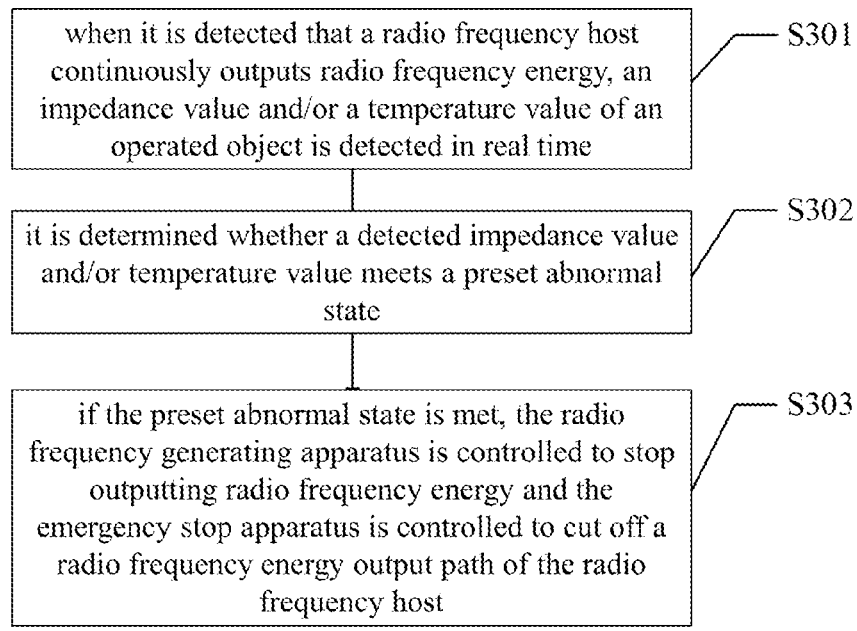
FIG. 3 is a schematic flow chart of a protection method for radio frequency operation abnormality according to another embodiment provided by this application.

Referring to FIG. 3, which is an implementation flow chart of a protection method for radio frequency operation abnormality provided by another embodiment of this application. The method can be applied in the radio frequency host as shown in FIG. 1. As shown in FIG. 3, the method specifically comprises the step as follows.

Step S301, when it is detected that a radio frequency host continuously outputs radio frequency energy, an impedance value and/or a temperature value of an operated object is detected in real time.

Impedance value or temperature value of the operating object being too high may cause irreversible damage to the operated object, and thus they are important protection factors. During a radio frequency operation process, an impedance value, or a temperature value, or both of an operating object is detected in real time.

Step 302, it is determined whether a detected impedance value and/or temperature value meets a preset abnormal state.

Specifically, it is determined whether a detected impedance value of an operated object is higher than a first preset impedance threshold, and whether a duration time of being higher than the first preset impedance threshold is greater than a preset duration, wherein the preset duration is preferably 3 seconds; and/or whether a temperature value of an operated object is higher than a first preset temperature threshold, and whether a duration time of being higher than the first preset temperature threshold is greater than the preset duration.

Both the first preset impedance threshold and the first preset temperature threshold are upper limit values, and specifically relate to task of the present radio frequency operation and a type of the operated object, which are not specifically limited.

If the impedance value of the operated object is higher than the first preset impedance threshold, and the duration time of being higher than the first preset impedance threshold is greater than the preset duration, or if the temperature value of the operated object is higher than the first preset temperature threshold, and the duration time of being higher than the first temperature impedance threshold is greater than the preset duration, it is determined that the preset abnormal state is met. That is, when any one value of the impedance value and the temperature value of the operated object is higher than an upper limit value, it can be determined that the current radio frequency operation appears the preset abnormal state.

Step S303, if the preset abnormal state is met, the radio frequency generating apparatus is controlled to stop outputting radio frequency energy and the emergency stop apparatus is controlled to cut off a radio frequency energy output path of the radio frequency host.

Specifically, on one hand, the detected detection data of the preset kind is sent to the controlling apparatus, the controlling apparatus can analyze that the preset abnormal state occurs according to the detection data, send stop signal for stopping generating and outputting radio frequency energy to the radio frequency generating apparatus, so as to control the radio frequency generating apparatus to stop outputting radio frequency energy.

Alternatively, after determining that the preset abnormal state occurs, the detecting apparatus directly sends abnormal state prompt signal to the controlling apparatus; the controlling apparatus sends stop signal for stopping generating and outputting radio frequency energy to the radio frequency generating apparatus according to the prompt signal.

On the other hand, the detecting apparatus controls the emergency stop apparatus to cut off a radio frequency energy output path of the radio frequency host; specifically, the detecting apparatus sends cutting signal to the emergency stop apparatus connected thereto, and the emergency stop apparatus cuts off a radio frequency energy output path between the radio frequency host and the operated object.

As described above, by means of the two different apparatuses, i.e., the detecting apparatus and the controlling apparatus, the radio frequency generating apparatus and the emergency stop apparatus are respectively controlled to simultaneously stop supplying radio frequency energy to the operated object, so that risk of failure caused by completing control via a single apparatus is avoided, a success rate of stopping delivering is improved, and safety of protecting the operated object and the radio frequency host is further improved.

Other technical details of the above steps refer to descriptions of the embodiment shown in aforementioned FIG. 2, and are not repeated here.

In this embodiment of this application, when the radio frequency host continuously outputs radio frequency energy, the impedance value and/or the temperature value of the radio frequency operated object is detected in real time; if any one of the impedance value and the temperature value is higher than a preset upper limit value, the radio frequency generating apparatus is controlled to stop outputting radio frequency energy and the emergency stop apparatus is controlled to cut off the radio frequency energy output path of the radio frequency host. The above two means of protection are performed at the same time, a success rate of protection is improved, and safety of radio frequency operations is improved.

Figure 4:
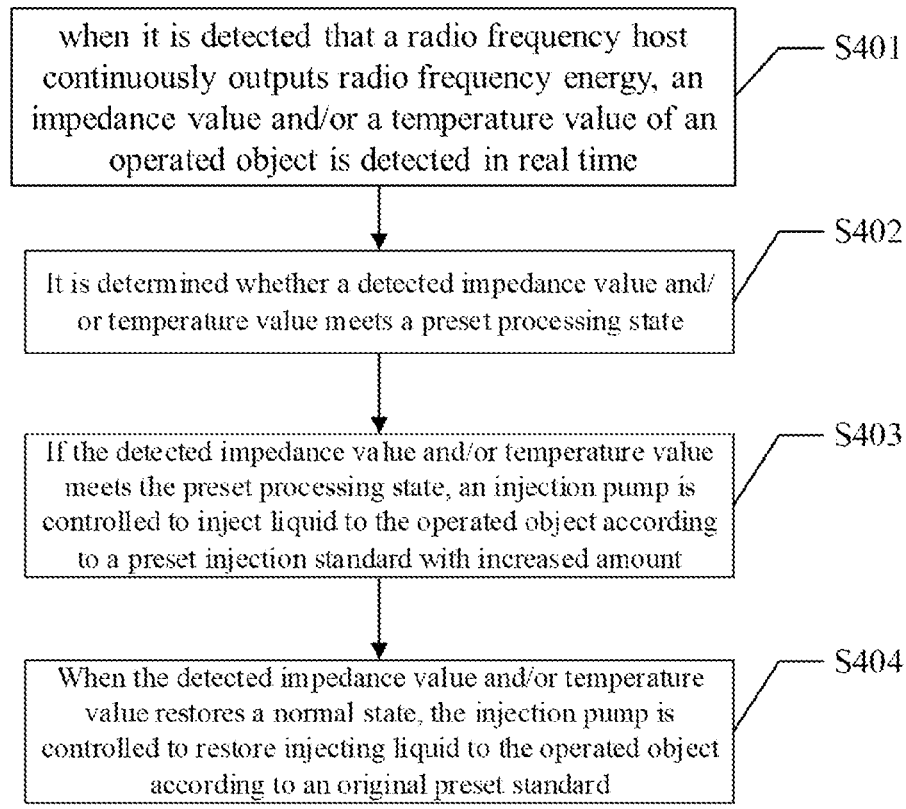
FIG. 4 is a schematic flow chart of a protection method for radio frequency operation abnormality according to another embodiment provided by this application.

Referring to FIG. 4, which is an implementation flow chart of a protection method for radio frequency operation abnormality provided by another embodiment of this application. The method can be applied in the radio frequency host as shown in FIG. 1. As shown in FIG. 4, the method specifically comprises the steps as follows.

Step 401, when it is detected that a radio frequency host continuously outputs radio frequency energy, an impedance value and/or a temperature value of an operated object is detected in real time.

Step S402, it is determined whether a detected impedance value and/or temperature value meets a preset processing state.

It is detected in real time whether the impedance value of the operated object is higher than a second preset impedance threshold, or it is detected in real time whether an increasing ratio of the impedance value of the operated object is higher than a first preset ratio; if being higher than the second preset impedance threshold or higher than the first preset ratio, it is determined that the preset processing state is met. That is, although no preset abnormal state occurs, when the impedance value of the operated object is higher than a normal value or its increasing ratio is larger than a normal ratio, it is represented that the operated object appears abnormality, but an extent requiring stopping radio frequency energy output is not reached, thus it is determined that the preset processing state is met.

It is detected in real time whether the temperature value of the operated object is higher than a second preset temperature threshold, or it is detected in real time whether an increasing ratio of the temperature value of the operated object is higher than a second preset ratio; if being higher than the second preset temperature threshold or higher than the second preset ratio, it is determined that the preset processing state is met. That is, although no preset abnormal state occurs, when the temperature value of the operated object is higher than a normal value or its increasing ratio is larger than a normal ratio, it is represented that the operated object appears abnormality, but an extent requiring stopping radio frequency energy output is not reached, thus it is determined that the preset processing state is met.

Step S403, if the detected impedance value and/or temperature value meets the preset processing state, an injection pump is controlled to inject liquid to the operated object according to a preset injection standard with increased amount.

When the impedance value and/or the temperature value of the operated object appears abnormal increase, but does not reach the extent requiring stopping radio frequency energy output, the injection pump is controlled to inject liquid configured to decrease the impedance value and/or the temperature value to the operated object according to a first preset injection standard with increased amount. Increasing injection amount can decrease the impedance value and the temperature value of the operated object.

Step S404, when the detected impedance value and/or temperature value restores a normal state, the injection pump is controlled to restore injecting liquid to the operated object according to an initial preset standard.

When it is detected that the impedance value of the operated object is lower than a third preset impedance threshold, and/or the temperature value of the operated object is lower than a third preset temperature threshold, it is determined that the impedance value and/or the temperature value of the operated object has restored to a normal value. Thus, liquid is injected to the operated object according to the initial preset injection standard with decreased amount, and injection amount is reduced to correspond to the impedance value and/or the temperature value in a normal state.

In this embodiment of this application, when it is detected that the radio frequency host continuously outputs radio frequency energy, the impedance value and/or the temperature value of the operated object is detected in real time. If the impedance value and/or the temperature value increases to meet the preset processing state, the injection pump is controlled to increase injection mount to decrease the impedance value and/or the temperature value; if the impedance value and/or the temperature value restores to the normal value, the injection pump is controlled to return to the initial injection amount to keep the impedance value and/or the temperature value of the operated object being at the normal value. By the above-mentioned dynamic adjustment for abnormality of the impedance value and/or the temperature value that does not reach the extent of stopping radio frequency energy output, it is possible to perform protection for the radio frequency object and the radio frequency host in advance, and improve safety of radio frequency operations.

Figure 5:
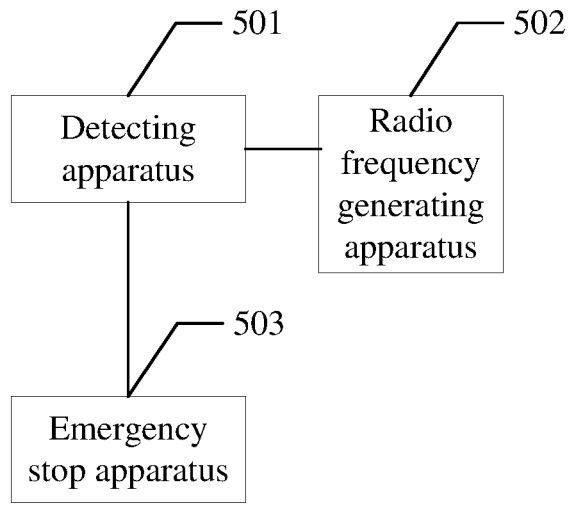
FIG. 5 is a structural schematic diagram of a radio frequency host according to an embodiment provided by this application.

Referring to FIG. 5, which is a structural schematic diagram of a radio frequency host provided by an embodiment of this application. In order to facilitate illustration, only parts relating to embodiments of this application are shown. The radio frequency host is the radio frequency host shown in above FIG. 1-FIG. 4, which comprises a detecting apparatus 501, a radio frequency generating apparatus 502, and an emergency stop apparatus 503.

The detecting apparatus 501 is configured to detect preset kinds of detection data of a radio frequency operation in real time when it is detected that the radio frequency host continuously outputs radio frequency energy;

the detecting apparatus 501 is further configured to: determine whether detected preset kinds of detection data meets a preset abnormal state; and the detecting apparatus 501 is further configured to control the radio frequency generating apparatus 502 to stop outputting radio frequency energy and control the emergency stop apparatus 503 to cut off a radio frequency energy output path if the preset abnormal state is met.

In this embodiment of this application, when the radio frequency host continuously outputs radio frequency energy, preset kinds of detection data of the radio frequency operation is detected in real time; it is determined whether detected data meets the preset abnormal state; and if yes, the radio frequency generating apparatus is controlled to stop outputting radio frequency energy and the emergency stop apparatus is controlled to cut off a radio frequency energy output path of the radio frequency host. The above two means of protection are performed at the same time to prevent protection failure caused by failure or malfunctioning of any one means from, a success rate of protection is improved, and safety of radio frequency operations is improved.

Figure 6:
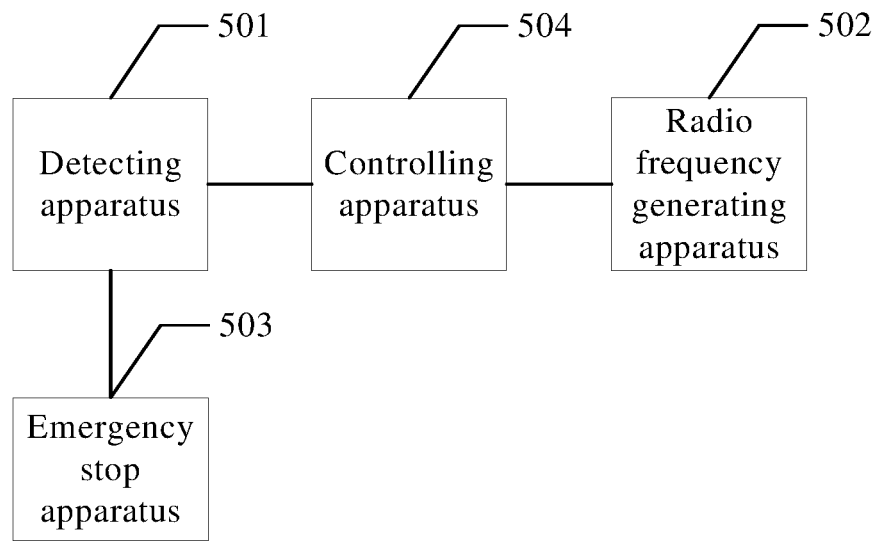
FIG. 6 is a structural schematic diagram of a radio frequency host according to another embodiment provided by this application.

Referring to FIG. 6, which is a structural schematic diagram of a radio frequency host provided by another embodiment of this application. The radio frequency host is the radio frequency host shown in above FIG. 1-FIG. 5, which differs from the embodiment shown in above FIG. 5 as follows.

Furthermore, the radio frequency host further comprises a controlling apparatus 504.

The detecting apparatus 501 is further configured to transmit detection data indicating that the preset abnormal state is met to the controlling apparatus 504 to trigger the controlling apparatus 504 to control the radio frequency generating apparatus 502 to stop outputting radio frequency energy. The controlling apparatus 504 is configured to transmit signal to the radio frequency generating apparatus 502 for stopping outputting radio frequency energy according to received detection data.

The controlling apparatus 504 can be further configured to analyze that the preset abnormal state occurs according to the detection data, and send a stop signal to the radio frequency generating apparatus 502 for stopping generating and outputting radio frequency energy.

In another aspect, the detecting apparatus 501 is further configured to directly send abnormal state prompt signal to the controlling apparatus 504 when determining that the preset abnormal state occurs; the controlling apparatus 504 is further configured to send a stop signal to the radio frequency generating apparatus according to the prompt signal for stopping generating and outputting radio frequency energy.

The detecting apparatus 501 is further configured to send cutting signal to the emergency stop apparatus 503, and thereby cut off a radio frequency energy output path between the radio frequency host and the operated object.

Furthermore, the detecting apparatus 501 is further configured to detect an impedance value and/or a temperature value of the operated object of the radio frequency operation in real time.

The detecting apparatus 501 is further configured to determine whether the impedance value of the operated object is higher than a first preset impedance threshold, and whether a duration time of being higher than the first preset impedance threshold is greater than a preset duration, and/or whether the temperature value of the operated object is higher than a first preset temperature threshold, and whether a duration time of being higher than the first preset temperature threshold is greater than the preset duration.

The detecting apparatus 501 or the controlling apparatus 504 is further configured to determine that the preset abnormal state is met when the impedance value of the operated object is higher than the first preset impedance threshold, and the duration time of being higher than the first preset impedance threshold is greater than the preset duration, or when the temperature value of the operated object is higher than the first preset temperature threshold, and the duration time of being higher than the first temperature impedance threshold is greater than the preset duration.

The detecting apparatus 501 is further configured to detect in real time whether the impedance value of the operated object is higher than a second preset impedance threshold, or detect in real time whether an increasing ratio of the impedance value of the operated object is higher than a first preset ratio; if being higher than the second preset impedance threshold or higher than the first preset ratio, send said detection signal or prompt signal to the controlling apparatus 504.

The controlling apparatus 504 is further configured to: according to the detection information or prompt signal, send a controlling instruction to an injection pump to control the injection pump to inject liquid configured to decrease the impedance value to the operated object with a first preset injection standard with increased amount.

The detecting apparatus 501 is further configured to: detect in real time whether the temperature value of the operated object is higher than a second preset temperature threshold, or detect in real time whether an increasing ratio of the temperature value of the operated object is higher than a second preset ratio; if being higher than the second preset temperature threshold or higher than the second preset ratio, send said detection signal or prompt signal to the controlling apparatus 504 for control.

The controlling apparatus 504 is further configured to: according to the detection information or prompt signal, send a controlling instruction to the injection pump to enable the injection pump to inject liquid configured to decrease the temperature to the operated object with a first preset injection standard with increased amount.

In this embodiment of this application, when the radio frequency host continuously outputs radio frequency energy, the impedance value and/or the temperature value of the radio frequency operated object is detected in real time; if any one of the impedance value and the temperature value is higher than the preset upper limit value, the radio frequency generating apparatus is controlled to stop outputting radio frequency energy and the emergency stop apparatus is controlled to cut off the radio frequency energy output path of the radio frequency host. The above two means of protection are performed at the same time, a success rate of protection is improved, and safety of radio frequency operations is improved.

Figure 7:
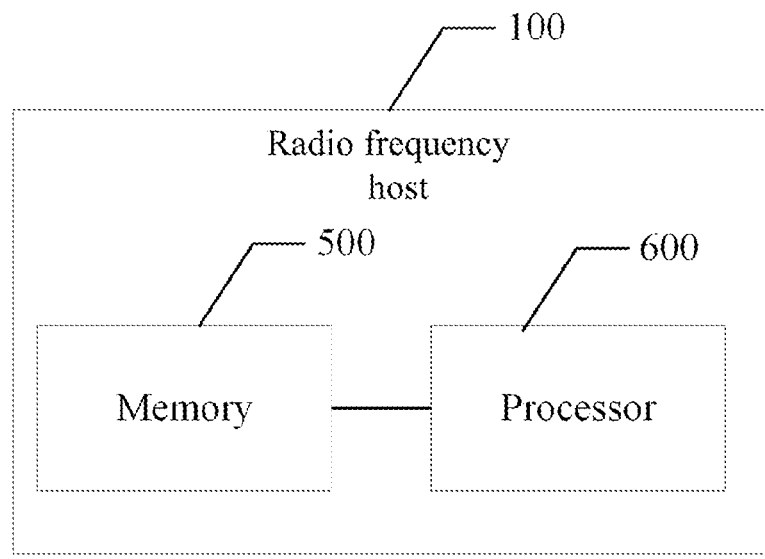
FIG. 7 is a structural schematic diagram of a radio frequency host according to another embodiment provided by this application.

As shown in FIG. 7, an embodiment of this application further provides a radio frequency host, which comprises a memory 500 and a processor 600, the processor 600 may be the detecting apparatus in the aforementioned embodiments, and may also be the controlling apparatus. The memory 500 is, for example, a hard disk drive memory, a non-volatile memory (such as a flash memory or other electronically programmable and deletion-restricted memory configured to form a solid state drive, etc.), a volatile memory (such as a static or dynamic random access memory, etc.), and so on. The embodiments of this application are not limited.

The memory 500 stores executable program codes. A processor 600 coupled with the memory 500 calls the executable program codes stored in the memory to execute the above-described protection method for radio frequency operation abnormality.

Further, an embodiment of this application further provides a computer-readable storage medium, the computer-readable storage medium can be provided in the radio frequency hosts in the above embodiments, and the computer-readable storage medium may be the memory 500 in the embodiment in the above embodiment shown in FIG. 7. The computer-readable storage medium stores a computer program, and the program, when being executed by a processor, implements the protection method for radio frequency operation abnormality described in the embodiments shown in above FIG. 2, FIG. 3, and FIG. 4. Further, the computer-readable storage medium may also be a U-disk, a mobile hard disk, a read-only memory (ROM), a RAM, a magnetic disk or a CD-ROM, and other media that can store program codes.

Figure 8:
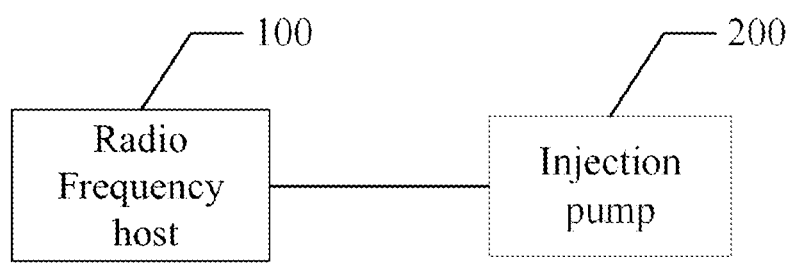
FIG. 8 is a structural schematic diagram of a radio frequency operation system according to an embodiment provided by this application.

Further, referring to FIG. 8, an embodiment of this application further provides a radio frequency operation system, which comprises a radio frequency host 100 and an injection pump 200.

The radio frequency host 100 is configured to implement the protection method for radio frequency operation abnormality described as FIG. 2, FIG. 3, and FIG. 4. The injection pump 200 is configured to inject liquid with a preset function to a radio frequency operated object under control of the radio frequency host.

Other technical details refer to descriptions of above-described embodiments.

It should be noted that regarding the foregoing method embodiments, for simplicity of description, they are all expressed as a series of action combinations, but those skilled in the art should know that the present invention is not limited by the described sequence of actions. Because according to the present invention, certain steps can be performed in other order or simultaneously. Secondly, those skilled in the art should also know that the embodiments described in the specification are all preferred embodiments, and the involved actions and modules are not necessarily all required by the present invention.

In the above-mentioned embodiments, the description of each embodiment has its own emphasis. For parts that are not described in detail in a certain embodiment, reference may be made to related descriptions of other embodiments.

The above is a description of the protection method for radio frequency operation abnormality, the radio frequency host, and the radio frequency operation system provided by the present disclosure. For those skilled in the art, according to the concepts of the embodiments of the present invention, both the specific implementation and the application scope will have changed parts. In summary, the content of this specification should not be construed as a limitation to the present invention.

What is claimed is:

1. A protection method for radio frequency operation abnormality, comprising steps of:
   detecting preset kinds of detection data of a radio frequency operation in real time when detecting that a radio frequency host continuously outputs radio frequency energy;
   determining whether detected preset kinds of detection data meets a preset abnormal state; and
   controlling a radio frequency generating apparatus to stop outputting radio frequency energy and controlling an emergency stop apparatus to cut off a radio frequency energy output path of the radio frequency host when the preset abnormal state is met,
   wherein the step of detecting preset kinds of detection data of a radio frequency operation in real time comprises:
   detecting an impedance value and/or a temperature value of the operated object of a radio frequency operation in real time,
   wherein the step of determining whether detected preset kinds of detection data meets a preset abnormal state comprises a step of:
   determining whether the impedance value of the operated object is higher than a first preset impedance threshold, and whether a duration time of being higher than the first preset impedance threshold is greater than a preset duration; and/or whether the temperature value of the operated object is higher than a first preset temperature threshold, and whether a duration time of being higher than the first preset temperature threshold is greater than the preset duration.

2. The method according to claim 1, wherein the radio frequency host comprises a detecting apparatus, a radio frequency generating apparatus, a controlling apparatus, and an emergency stop apparatus; and the step of controlling a radio frequency generating apparatus to stop outputting radio frequency energy and controlling an emergency stop apparatus to cut off a radio frequency energy output path of the radio frequency host comprises:
   transmitting, by the detecting apparatus, detection data meeting the preset abnormal state to the controlling apparatus to trigger the controlling apparatus to control the radio frequency generating apparatus to stop outputting radio frequency energy, and transmitting, by the detecting apparatus, a cutting signal to the emergency stop signal to cut off a radio frequency energy output path between the radio frequency host and an operated object.

3. The method according to claim 1, after the step of determining whether detected preset kinds of detection data meets a preset abnormal state, further comprising:
   when the impedance value of the operated object is higher than the first preset impedance threshold, and the duration time of being higher than the first preset impedance threshold is greater than the preset duration, or when the temperature value of the operated object is higher than the first preset temperature threshold, and the duration time of being higher than the first temperature impedance threshold is greater than the preset duration, determining that the preset abnormal state is met.

4. The method according to claim 3, further comprising a step of:
   detecting in real time whether the impedance value of the operated object is higher than a second preset impedance threshold, or detecting in real time whether an increasing ratio of the impedance value of the operated object is higher than a first preset ratio; when the impedance value of the operated object is higher than the second preset impedance threshold or the increasing ratio of the impedance value of the operated object is higher than the first preset ratio, controlling an injection pump to inject liquid configured to decrease the impedance value to the operated object according to a first preset injection standard with increased amount.

5. The method according to claim 4, further comprising a step of:
   detecting in real time whether the temperature value of the operated object is higher than a second preset temperature threshold, or detecting in real time whether an increasing ratio of the temperature value of the operated object is higher than a second preset ratio; when the temperature value of the operated object is higher than the second preset temperature threshold or the increasing ratio of the temperature value of the operated object is higher than the second preset ratio, controlling the injection pump to inject liquid configured to decrease the temperature to the operated object according to the first preset injection standard with increased amount.

6. A radio frequency host, comprising:
   a memory and a processor;
   wherein the memory stores executable program codes;
   the processor coupled with the memory calls the executable program codes stored in the memory to execute the protection method for radio frequency operation abnormality according to claim 1.

7. A radio frequency operation system, comprising: a radio frequency host and an injection pump;
   wherein the radio frequency host is configured to execute the protection method for radio frequency operation abnormality according to claim 1; and
   the injection pump is configured to inject liquid with a preset function to a radio frequency operated object under control of the radio frequency host.

8. A radio frequency host, comprising a detecting apparatus, a radio frequency generating apparatus, and an emergency stop apparatus;
   wherein the detecting apparatus is configured to detect preset kinds of detection data of a radio frequency operation in real time when it is detected that the radio frequency host continuously outputs radio frequency energy;
   the detecting apparatus is further configured to determine whether detected preset kinds of detection data meets a preset abnormal state; and
   the detecting apparatus is further configured to control the radio frequency generating apparatus to stop outputting radio frequency energy and control the emergency stop apparatus to cut off a radio frequency energy output path when the preset abnormal state is met,
   wherein the detecting apparatus is further configured to detect an impedance value and/or a temperature value of the operated object of a radio frequency operation in real time, and
   the detecting apparatus is further configured to determine whether the impedance value of the operated object is higher than a first preset impedance threshold, and whether a duration time of being higher than the first preset impedance threshold is greater than a preset duration; and/or whether the temperature value of the operated object is higher than a first preset temperature threshold, and whether a duration time of being higher than the first preset temperature threshold is greater than the preset duration.

9. The radio frequency host according to claim 8, further comprising a controlling apparatus;
  wherein the detecting apparatus is further configured to transmit detection data meeting the preset abnormal state to the controlling apparatus and thereby triggering the controlling apparatus to control the radio frequency generating apparatus to stop outputting radio frequency energy; and is further configured to send a cutting signal to the emergency stop apparatus and thereby cutting off a radio frequency energy output path between the radio frequency host and the operated object.

* * * * *